United States Patent
Dimou et al.

(10) Patent No.: US 12,089,212 B2
(45) Date of Patent: Sep. 10, 2024

(54) INDICATION OF A CANCELLED HYBRID AUTOMATIC REPEAT REQUEST (HARQ) CODEBOOK

(71) Applicant: QUALCOMM Incorporated, San Diego, CA (US)

(72) Inventors: Konstantinos Dimou, San Francisco, CA (US); Yan Zhou, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 537 days.

(21) Appl. No.: 17/443,383

(22) Filed: Jul. 26, 2021

(65) Prior Publication Data

US 2023/0021331 A1   Jan. 26, 2023

(51) Int. Cl.
*H04W 72/20* (2023.01)
*H04L 1/1812* (2023.01)
*H04W 72/0446* (2023.01)

(52) U.S. Cl.
CPC ........... *H04W 72/20* (2023.01); *H04L 1/1812* (2013.01); *H04W 72/0446* (2013.01)

(58) Field of Classification Search
CPC .............. H04W 72/20; H04W 72/0446; H04L 1/1812; H04L 1/1854; H04L 1/1861; H04L 1/1896
See application file for complete search history.

(56) References Cited

U.S. PATENT DOCUMENTS

| | | | |
|---|---|---|---|
| 2020/0296758 A1* | 9/2020 | Li | H04L 5/001 |
| 2021/0409182 A1* | 12/2021 | Lee | H04L 1/1864 |
| 2022/0295262 A1* | 9/2022 | Shahidi | H04W 72/569 |
| 2022/0322395 A1* | 10/2022 | Taherzadeh Boroujeni | H04W 72/20 |
| 2022/0330307 A1* | 10/2022 | Korhonen | H04W 72/23 |
| 2023/0043297 A1* | 2/2023 | Dimou | H04L 1/1896 |
| 2023/0261807 A1* | 8/2023 | Bae | H04W 72/23 370/329 |
| 2023/0299891 A1* | 9/2023 | Kittichokechai | H04L 1/1896 370/336 |

* cited by examiner

*Primary Examiner* — Abdullahi Ahmed
(74) *Attorney, Agent, or Firm* — Harrity & Harrity, LLP

(57) ABSTRACT

Various aspects of the present disclosure generally relate to wireless communication. In some aspects, a user equipment (UE) may receive, from a base station, information that indicates a resource allocation for a downlink transmission and an uplink resource for transmission of a hybrid automatic repeat request (HARQ) codebook. The UE may transmit, to the base station, uplink control information (UCI) that includes an indication of whether transmission of the HARQ codebook is cancelled. Numerous other aspects are described.

30 Claims, 11 Drawing Sheets

INDICATION OF A CANCELLED HYBRID AUTOMATIC REPEAT REQUEST (HARQ) CODEBOOK

FIELD OF THE DISCLOSURE

Aspects of the present disclosure generally relate to wireless communication and to techniques and apparatuses for indication of a cancelled hybrid automatic repeat request (HARQ) codebook.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by an apparatus of a user equipment (UE). The method may include receiving, from a base station, information that indicates a resource allocation for a downlink transmission and an uplink resource for transmission of a hybrid automatic repeat request (HARQ) codebook. The method may include transmitting, to the base station, uplink control information (UCI) that includes an indication of whether transmission of the HARQ codebook is cancelled.

Some aspects described herein relate to a method of wireless communication performed by an apparatus of a base station. The method may include transmitting, to a UE, information that indicates a resource allocation for a downlink transmission and an uplink resource for transmission of an HARQ codebook. The method may include receiving, from the UE, UCI that includes an indication of whether transmission of the HARQ codebook is cancelled.

Some aspects described herein relate to an apparatus for wireless communication at a UE. The apparatus may include a memory. The apparatus may include one or more processors, coupled to the memory, configured to receive, from a base station, information that indicates a resource allocation for a downlink transmission and an uplink resource for transmission of an HARQ codebook. The one or more processors may be configured to transmit, to the base station, UCI that includes an indication of whether transmission of the HARQ codebook is cancelled.

Some aspects described herein relate to an apparatus for wireless communication at a base station. The apparatus may include a memory. The apparatus may include one or more processors, coupled to the memory, configured to transmit, to a UE, information that indicates a resource allocation for a downlink transmission and an uplink resource for transmission of an HARQ codebook. The one or more processors may be configured to receive, from the UE, UCI that includes an indication of whether transmission of the HARQ codebook is cancelled.

Some aspects described herein relate to a non-transitory computer-readable medium that stores a set of instructions for wireless communication by a UE. The set of instructions, when executed by one or more processors of the UE, may cause the UE to receive, from a base station, information that indicates a resource allocation for a downlink transmission and an uplink resource for transmission of an HARQ codebook. The set of instructions, when executed by one or more processors of the UE, may cause the UE to transmit, to the base station, UCI that includes an indication of whether transmission of the HARQ codebook is cancelled.

Some aspects described herein relate to a non-transitory computer-readable medium that stores a set of instructions for wireless communication by a base station. The set of instructions, when executed by one or more processors of the base station, may cause the base station to transmit, to a UE, information that indicates a resource allocation for a downlink transmission and an uplink resource for transmission of an HARQ codebook. The set of instructions, when executed by one or more processors of the base station, may cause the base station to receive, from the UE, UCI that includes an indication of whether transmission of the HARQ codebook is cancelled.

Some aspects described herein relate to an apparatus for wireless communication. The apparatus may include means for receiving, from a base station, information that indicates a resource allocation for a downlink transmission and an uplink resource for transmission of an HARQ codebook. The apparatus may include means for transmitting, to the base station, UCI that includes an indication of whether transmission of the HARQ codebook is cancelled.

Some aspects described herein relate to an apparatus for wireless communication. The apparatus may include means for transmitting, to a user equipment (UE), information that indicates a resource allocation for a downlink transmission and an uplink resource for transmission of an HARQ codebook. The apparatus may include means for receiving, from the UE, UCI that includes an indication of whether transmission of the HARQ codebook is cancelled.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
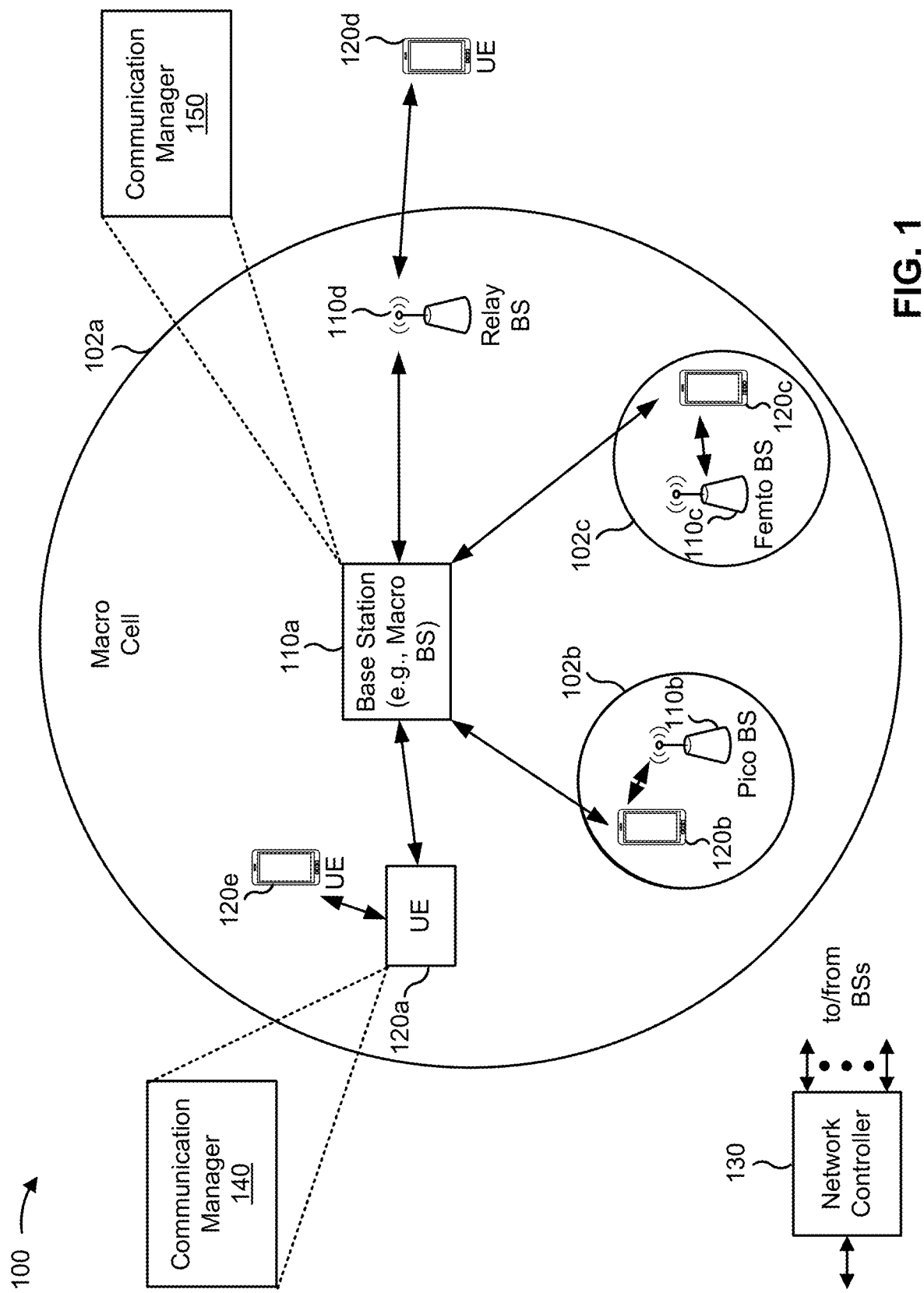
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive, from a base station, information that indicates a resource allocation for a downlink transmission and an uplink resource for transmission of a hybrid automatic repeat request (HARQ) codebook; and transmit, to the base station, uplink control information (UCI) that includes an indication of whether transmission of the HARQ codebook is cancelled. Additionally, or alternatively, the communication manager 140 may perform one or more other operations described herein.

In some aspects, the base station 110 may include a communication manager 150. As described in more detail elsewhere herein, the communication manager 150 may transmit, to a UE, information that indicates a resource allocation for a downlink transmission and an uplink resource for transmission of an HARQ codebook; and receive, from the UE, UCI that includes an indication of whether transmission of the HARQ codebook is cancelled. Additionally, or alternatively, the communication manager 150 may perform one or more other operations described herein.

As indicated above, FIG. 1 is provided as an example. Other examples may differ from what is described with regard to FIG. 1.

Figure 2:
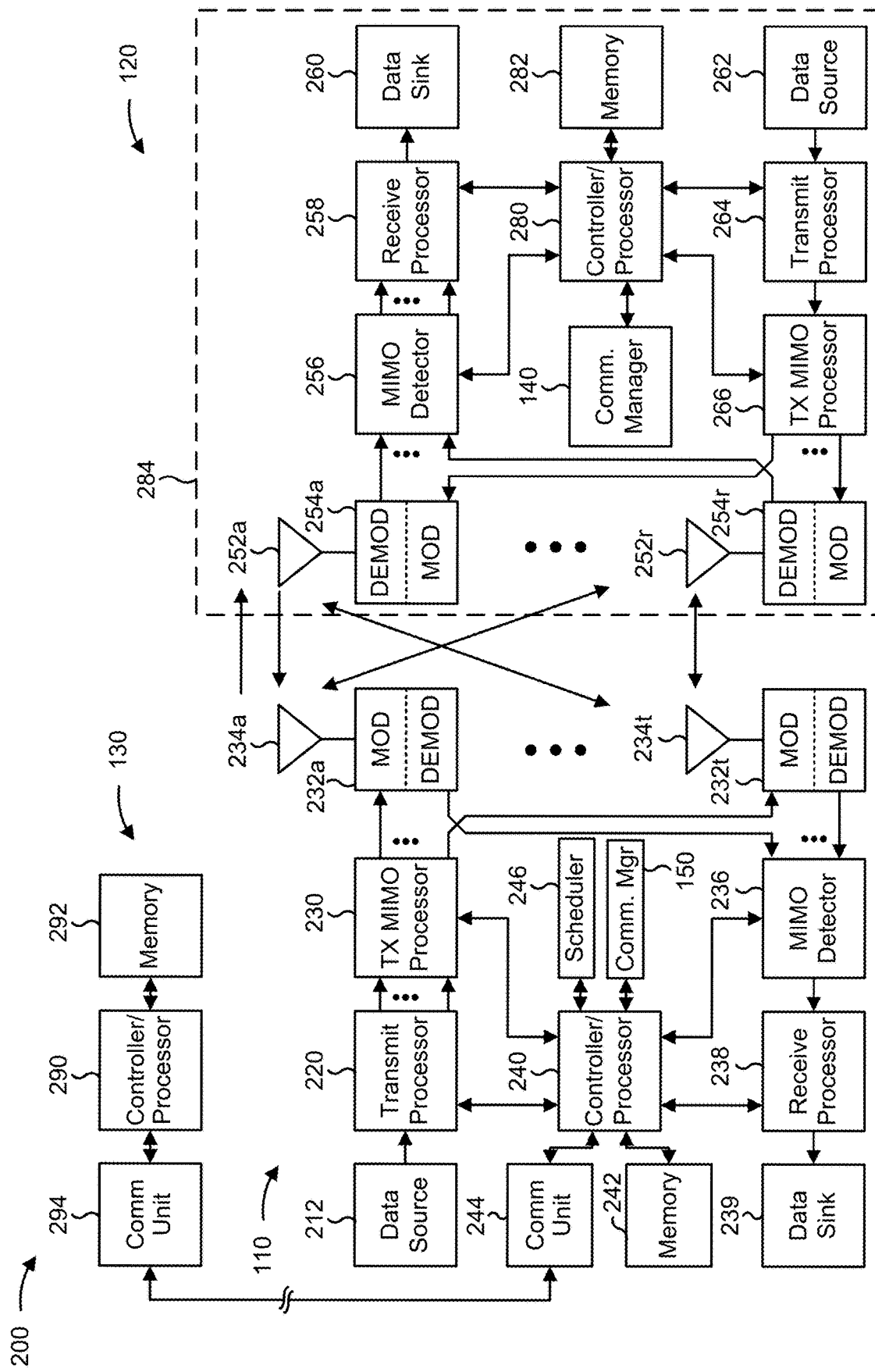
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T>1). The UE 120 may be equipped with a set of antennas 252a through 252r, such as R antennas (R>1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The UE 120 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 7-9).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 7-9).

The controller/processor 240 of the base station 110, the controller/processor 280 of the UE 120, and/or any other component(s) of FIG. 2 may perform one or more techniques associated with indication of a cancelled HARQ codebook, as described in more detail elsewhere herein. For example, the controller/processor 240 of the base station 110, the controller/processor 280 of the UE 120, and/or any other component(s) of FIG. 2 may perform or direct operations of, for example, process 800 of FIG. 8, process 900 of FIG. 9, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 800 of FIG. 8, process 900 of FIG. 9, and/or other processes as described herein. In some examples, executing instructions may include running the instructions, converting the instructions, compiling the instructions, and/or interpreting the instructions, among other examples.

In some aspects, the UE 120 includes means for receiving, from a base station 110, information that indicates a resource allocation for a downlink transmission and an uplink resource for transmission of an HARQ codebook; and/or means for transmitting, to the base station, UCI that includes an indication of whether transmission of the HARQ codebook is cancelled. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the base station includes means for transmitting, to a UE, information that indicates a resource allocation for a downlink transmission and an uplink resource for transmission of an HARQ codebook; and/or means for receiving, from the UE, UCI that includes an indication of whether transmission of the HARQ codebook is cancelled. The means for the base station to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
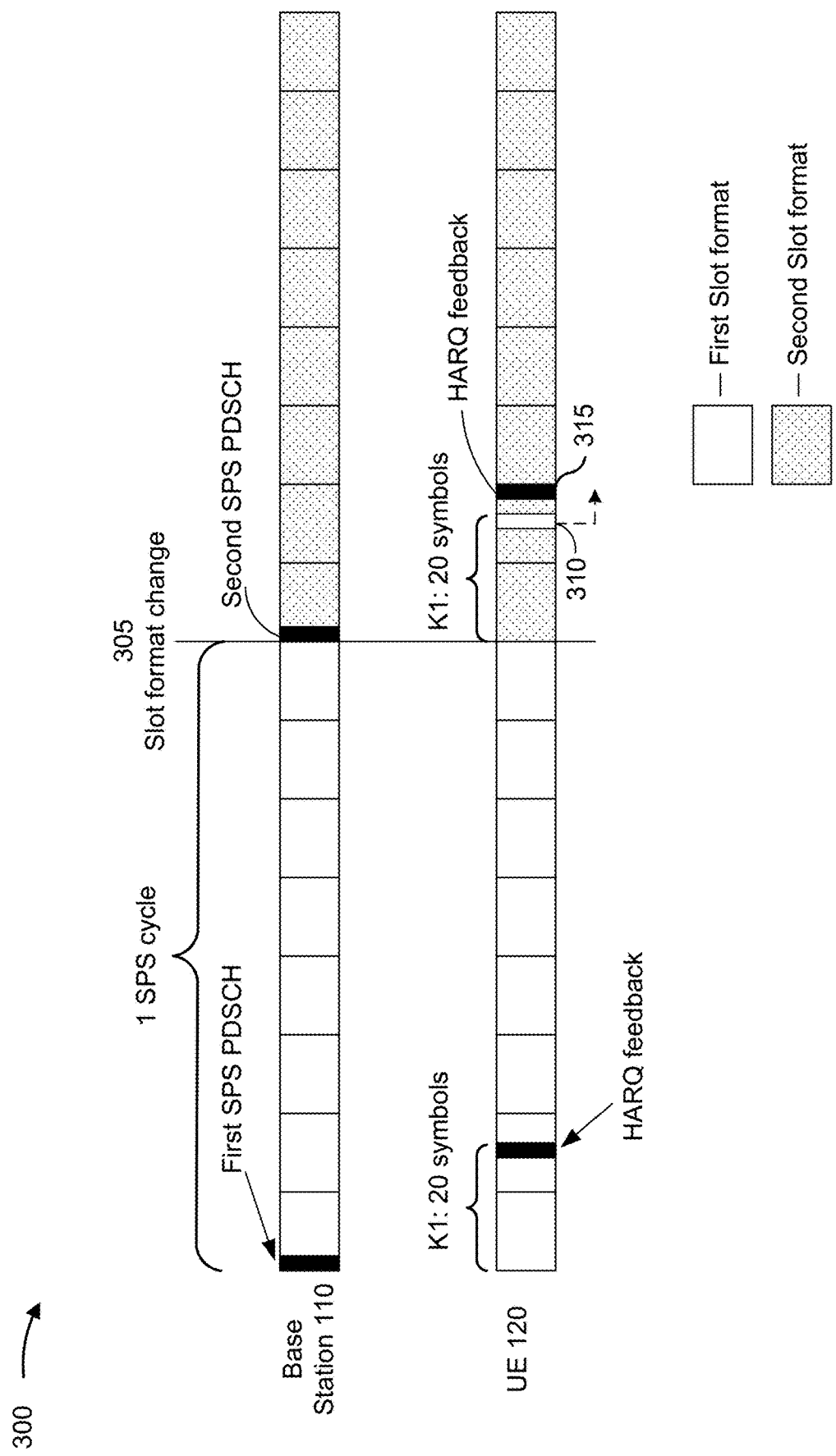
FIG. 3 is a diagram illustrating an example associated with deferred semi-persistent scheduling (SPS) hybrid automatic repeat request (HARQ) feedback, in accordance with the present disclosure.

FIG. 3 is a diagram illustrating an example 300 associated with deferred semi-persistent scheduling (SPS) HARQ feedback, in accordance with the present disclosure. SPS may be used to schedule a set of downlink transmissions for a UE 120 without requiring individual downlink grants (e.g., in downlink control information (DCI)) for each downlink transmission, thereby conserving signaling overhead. For example, a base station 110 may transmit, to a UE 120, an SPS configuration that indicates a set of SPS resources to be used for SPS communications (e.g., downlink communications, as indicated above), such as a set of time resources, a set of frequency resources, or the like. For example, the SPS configuration may indicate a periodicity of SPS communications, and the periodicity may indicate the set of time resources allocated for the SPS communications.

HARQ feedback provides a mechanism for indicating, to a transmitter of a communication, whether the communication was successfully received. For example, the transmitter may transmit scheduling information for the communication. A receiver of the scheduling information may monitor resources indicated by the scheduling information in order to receive the communication. If the receiver successfully receives the communication, the receiver may transmit an acknowledgment (ACK) in HARQ feedback. If the receiver fails to receive the communication, the receiver may transmit a negative ACK (NACK) in HARQ feedback. Thus, based at least in part on the HARQ feedback, the transmitter can determine whether the communication should be retransmitted. HARQ feedback is often implemented using a single bit, where a first value of the bit indicates an ACK and a second value of the bit indicates a NACK. Such a bit may be referred to as a HARQ-ACK bit. HARQ feedback may be conveyed in a HARQ codebook, which may include one or more bits indicating ACKs or NACKs corresponding to one or more communications. HARQ feedback may also be referred to as HARQ-ACK feedback or information, ACK or NACK (ACK/NACK) feedback or information, or the like.

As shown in FIG. 3, example 300 includes a first SPS cycle including eight slots of a first slot format and a second SPS cycle including eight slots of a second slot format for use by a base station 110 and a UE 120. For example, one slot may be 125 μs, and one SPS cycle may be 1 ms. In example 300, the first slot format may be slot format 42, and the second slot format may be slot format 33, among other examples.

As shown in FIG. 3, in the first SPS cycle, the base station 110 may transmit a first SPS physical downlink shared channel (PDSCH) communication in a first sub-slot (e.g., one or more symbols) in the first slot of the first slot format. The UE 120 may transmit the HARQ feedback for the first SPS PDSCH communication in a sub-slot of the second slot (e.g., the feedback slot) based at least in part on a duration (K1) indicated for physical uplink control channel (PUCCH) feedback.

As shown by reference number 305, the UE 120 may receive, from the base station 110, information indicating a change to the slot format (e.g., from the first slot format to the second slot format). In the second SPS cycle, the base station 110 may transmit a second SPS PDSCH communication in a first sub-slot of a first slot of the second slot format. The K1 duration configured for PUCCH feedback indicates for the UE 120 to use sub-slot 310 of the subsequent slot for transmitting the HARQ feedback for the second SPS PDSCH communication. However, the UE 120 may determine that the sub-slot 310 is a downlink or flexible sub-slot in the second slot format, and therefore collision (e.g., in time resources) will occur if the sub-slot 310 is used for transmitting the HARQ feedback. Accordingly, the UE 120 may defer (or delay) transmitting the HARQ feedback to an available uplink sub-slot 315. For example, the sub-slot 315 may be a first available uplink sub-slot after the sub-slot 310.

As indicated above, FIG. 3 is provided as an example. Other examples may differ from what is described with respect to FIG. 3.

Figure 4:
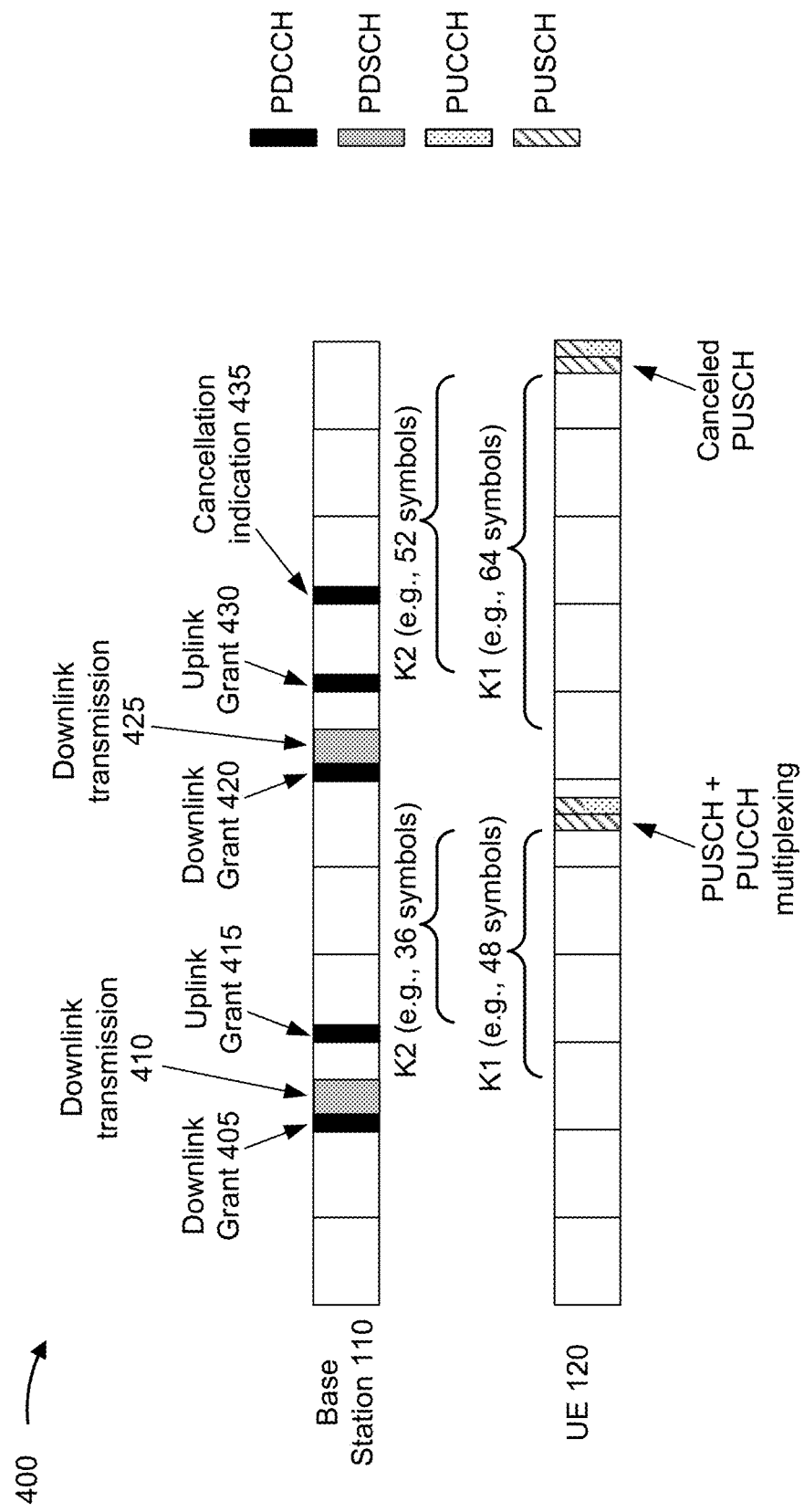
FIG. 4 is a diagram illustrating an example associated with cancellation of a physical uplink shared channel (PUSCH), in accordance with the present disclosure.

FIG. 4 is a diagram illustrating an example 400 associated with cancellation of a physical uplink shared channel (PUSCH), in accordance with the present disclosure. As shown in FIG. 4, a base station 110 may transmit (e.g., in a physical downlink control channel (PDCCH)) to a UE 120 a downlink grant 405 (e.g., in DCI, such as in DCI format 1_1) scheduling a downlink transmission 410. The downlink grant 405 may indicate an uplink resource (e.g., in a PUCCH) for transmission of HARQ feedback for the downlink transmission 410 (e.g., according to a duration K1). The base station 110 may perform the downlink transmission 410 (e.g., in a PDSCH) in accordance with the downlink grant 405. Thereafter, the base station 110 may transmit (e.g., in a PDCCH) to the UE 120 an uplink grant 415 (e.g., in DCI, such as in DCI format 0_1). The uplink grant 415 may indicate an uplink resource (e.g., in a PUSCH) for an uplink transmission (e.g., according to a duration K2). In some examples, the uplink grant 415 may indicate that the PUCCH for the HARQ feedback is to be multiplexed on the PUSCH for the uplink transmission. Accordingly, the UE 120 may transmit the PUCCH for the HARQ feedback multiplexed on the PUSCH for the uplink transmission.

As further shown in FIG. 4, the base station 110 may transmit to the UE 120 a downlink grant 420, as described above. The base station 110 may perform a downlink transmission 425 according to the downlink grant 420, as described above. The base station 110 may transmit to the UE 120 an uplink grant 430, as described above. For example, the uplink grant 430 may indicate that HARQ feedback for the downlink transmission 425 is to be multiplexed on a PUSCH for an uplink transmission scheduled by the uplink grant 430. Thereafter, the base station 110 may transmit (e.g., in a PDCCH) to the UE 120 a cancellation indication 435 (e.g., in DCI, such as in DCI format 2_4) for the PUSCH for the uplink transmission. The cancellation indication 435 may indicate that the PUSCH for the uplink transmission is to be cancelled (e.g., to permit a higher priority PUSCH for the UE 120 or another UE). Cancellation of the PUSCH for the uplink transmission may also cancel the HARQ feedback that was to be multiplexed on the PUSCH. The aforementioned scenario may also be applicable to a PUSCH according to a configured grant (e.g., where HARQ feedback is to be multiplexed with a configured grant PUSCH).

As indicated above, FIG. 4 is provided as an example. Other examples may differ from what is described with respect to FIG. 4.

Figure 5:
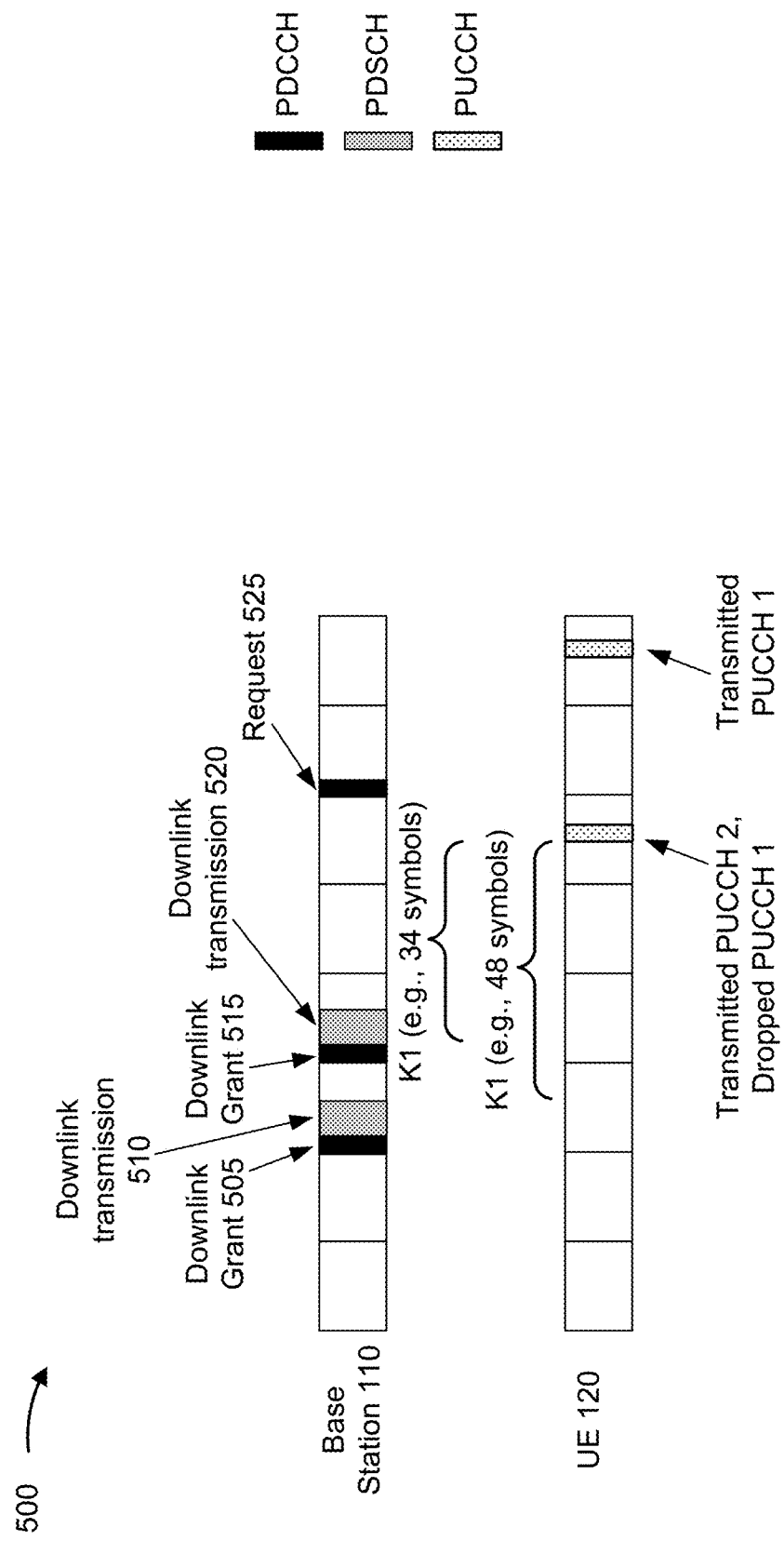
FIG. 5 is a diagram illustrating an example associated with dropping of HARQ feedback, in accordance with the present disclosure.

FIG. 5 is a diagram illustrating an example 500 associated with dropping of HARQ feedback, in accordance with the present disclosure. As shown in FIG. 5, a base station 110 may transmit (e.g., in a PDCCH) to a UE 120 a downlink grant 505 (e.g., in DCI, such as in DCI format 1_1) scheduling a downlink transmission 510. The downlink grant 505 may indicate an uplink resource (e.g., in a PUCCH, shown as PUCCH 1) for transmission of HARQ feedback for the downlink transmission 510 (e.g., according to a duration K1, where K1 is greater than the sum of a K1 minimum value and one slot). As further shown in FIG. 5, the base station 110 may transmit (e.g., in a PDCCH) to the UE 120 a downlink grant 515 (e.g., in DCI, such as in DCI format 1_1) scheduling a downlink transmission 520. The downlink grant 515 may indicate an uplink resource (e.g., in a PUCCH, shown as PUCCH 2) for transmission of HARQ feedback for the downlink transmission 520.

The downlink transmission 520 may be associated with a higher priority than a priority associated with the downlink transmission 510. Thus, the downlink transmission 520 may be considered to be high priority, and the downlink transmission 510 may be considered to be low priority. The uplink resource for transmission of HARQ feedback for the low priority downlink transmission 510 and the uplink resource for transmission of HARQ feedback for the high priority downlink transmission 520 may overlap in time. Moreover, the uplink resource for transmission of HARQ feedback for the high priority downlink transmission 520 may not be sufficient to also transmit HARQ feedback for the low priority downlink transmission 510 (e.g., multiplexing of PUCCH 1 and PUCCH 2 is not possible). Accordingly, the UE 120 may drop (e.g., internally cancel) the transmission of the HARQ feedback for the low priority downlink transmission 510 (e.g., the UE 120 may drop PUCCH 1), and the UE 120 may transmit the HARQ feedback for the high priority downlink transmission 520 (e.g., the UE 120 may transmit PUCCH 2).

Thereafter, the base station 110 may transmit (e.g., in a PDCCH) to the UE 120 a request 525 (e.g., in DCI, such as in DCI format 1_1) to transmit cancelled HARQ feedback (e.g., to transmit the dropped HARQ codebook). The request 525 may indicate a duration (1(1) for transmitting the cancelled HARQ feedback. The request 525 may not include a PUCCH resource indicator (PRI) for transmitting the cancelled HARQ feedback. The UE 120 may transmit the cancelled HARQ feedback (e.g., the UE 120 may transmit PUCCH 1) using a PRI indicated by the downlink grant 505. In other words, the request 525 may provide one-shot triggering of HARQ-ACK feedback retransmission on a PUCCH resource. In connection with the request 525, the HARQ feedback may be other than a Type 2 or (enhanced) Type 3 HARQ codebook. In a Type 2 HARQ codebook, or a dynamic HARQ codebook, the quantity of ACK/NACK bits reported by a UE may vary across different PUCCH resources in which HARQ-ACK feedback is reported (e.g., as opposed to a Type 1 HARQ-ACK codebook, or a semi-static HARQ-ACK codebook, in which the quantity of ACK/NACK bits reported by a UE is fixed across different PUCCH resources). In an enhanced Type 3 HARQ codebook, the quantity of ACK/NACK bits reported by a UE is determined at least in part by radio resource control (RRC) configuration.

As used herein, "cancelled HARQ," "cancelled HARQ feedback," "cancelled HARQ codebook," or the like, may refer to HARQ feedback that is dropped in favor of HARQ feedback for a higher priority downlink transmission (as described in connection with FIG. 5), HARQ feedback that is cancelled due to cancellation of a PUSCH on which the HARQ feedback is to be multiplexed (as described in connection with FIG. 4), HARQ feedback that is deferred due to collision of an uplink resource with a downlink or flexible resource resulting from a slot format change (as described in connection with FIG. 3), as well as similar scenarios.

As indicated above, FIG. 5 is provided as an example. Other examples may differ from what is described with respect to FIG. 5.

Figure 6:
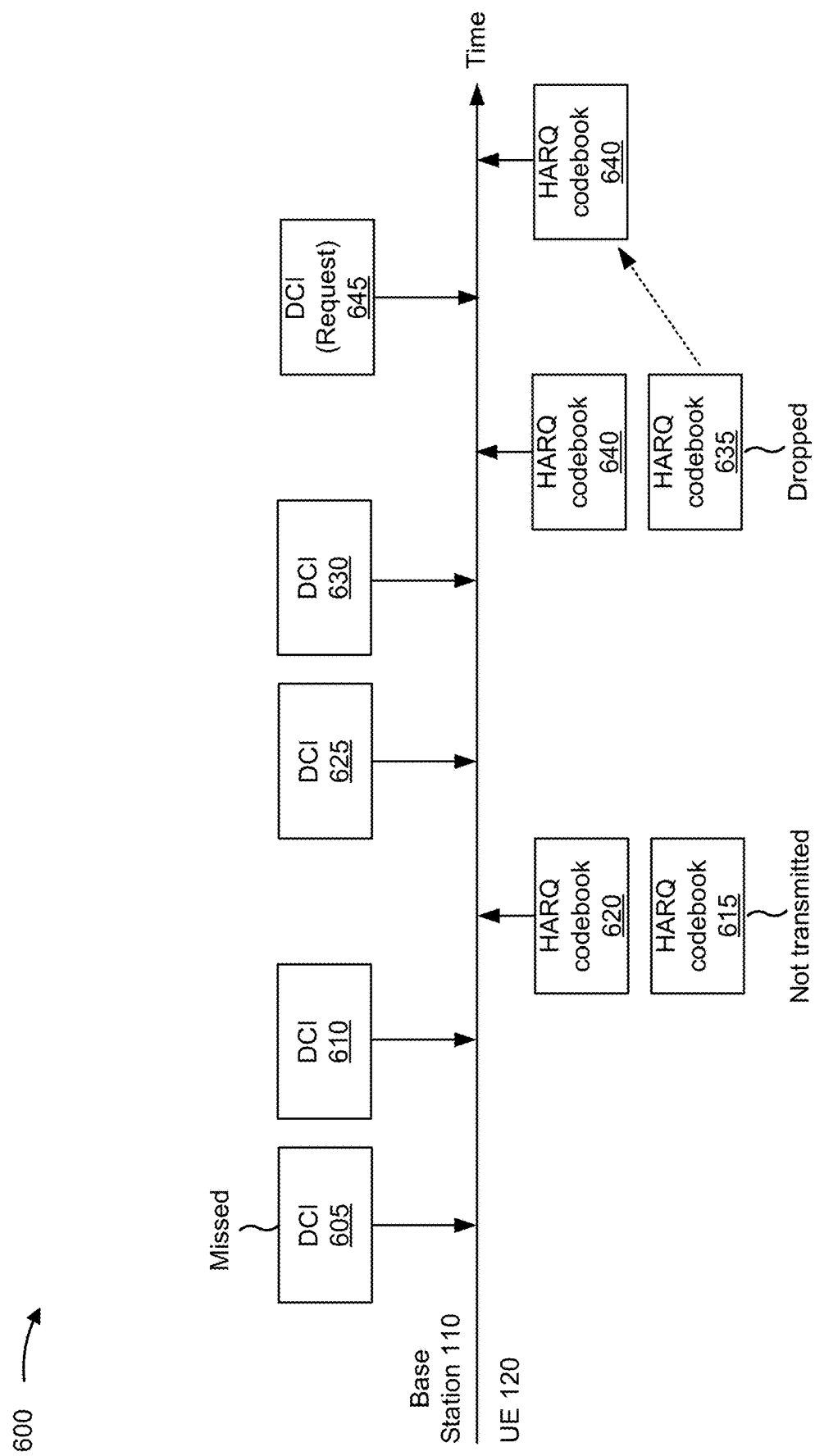
FIG. 6 is a diagram illustrating an example associated with dropping of HARQ feedback, in accordance with the present disclosure.

FIG. 6 is a diagram illustrating an example 600 associated with dropping of HARQ feedback, in accordance with the present disclosure. As shown in FIG. 6, a base station 110 may transmit DCI 605 (e.g., in DCI format 1_2) to a UE 120. The DCI 605 may schedule a downlink transmission and may indicate an uplink resource (e.g., using a PRI) for transmission of a PUCCH including a first HARQ codebook 615. The UE 120 may miss the DCI 605 (e.g., because the UE 120 failed to monitor the PDCCH carrying the DCI 605, failed to decode the DCI 605, or the like). Thereafter, the base station 110 may transmit DCI 610 (e.g., in DCI format 1_2) to the UE 120. The DCI 610 may schedule a downlink transmission and may indicate an uplink resource (e.g., using a PRI) for transmission of a second PUCCH including a second HARQ codebook 620. The downlink transmission scheduled by the DCI 610 may be associated with a higher priority than a priority associated with the downlink transmission scheduled by the DCI 605, and the uplink resource indicated by the DCI 610 may overlap in time with the uplink resource indicated by the DCI 605, in a similar manner as described above.

As further shown in FIG. 6, the UE 120 may transmit the second HARQ codebook 620 to the base station 110 in the uplink resource indicated by the DCI 610. The UE 120 may not transmit the first HARQ codebook 615 due to missing the DCI 605. However, had the UE 120 received the DCI 605, the UE 120 would have dropped transmission of the first HARQ codebook 615 because the downlink transmission scheduled by the DCI 610 has a higher priority than the downlink transmission scheduled by the DCI 605.

As further shown in FIG. 6, the base station 110 may transmit DCI 625 (e.g., in DCI format 1_2) to the UE 120. The DCI 625 may schedule a downlink transmission and may indicate an uplink resource (e.g., using a PRI) for transmission of a third PUCCH including a third HARQ codebook 635. Thereafter, the base station 110 may transmit DCI 630 (e.g., in DCI format 1_2) to the UE 120. The DCI 630 may schedule a downlink transmission and may indicate an uplink resource (e.g., using a PRI) for transmission of a fourth PUCCH including a fourth HARQ codebook 640. The downlink transmission scheduled by the DCI 630 may be associated with a higher priority than a priority associated with the downlink transmission scheduled by the DCI 625, and the uplink resource indicated by the DCI 630 may overlap in time with the uplink resource indicated by the DCI 625, in a similar manner as described above.

As further shown in FIG. 6, the UE 120 may transmit the fourth HARQ codebook 640 to the base station 110 in the uplink resource indicated by the DCI 630. The UE 120 may drop the transmission of the third HARQ codebook 635 because the downlink transmission scheduled by the DCI 630 has a higher priority than the downlink transmission scheduled by the DCI 625. Thereafter, the base station 110 may transmit DCI 645 that includes a request for the UE 120 to transmit only the earliest (in time) HARQ codebook that was cancelled by the UE 120, in a similar manner as described above. In some examples, the request may be for the UE 120 to transmit the latest HARQ codebook, or a particular HARQ codebook, that was cancelled by the UE 120. In response, the UE 120 may transmit the third HARQ codebook 635 to the base station 110 (e.g., because the UE 120 did not transmit the first HARQ codebook 615 due to missing the DCI 605, rather than dropping the first HARQ codebook 615).

However, this may result in ambiguity at the base station 110 because the base station 110 may have expected to receive the first HARQ codebook 615. Similar ambiguities may result (e.g., in connection with missed DCI) from a slot format change resulting in an uplink resource for HARQ feedback colliding with a downlink or flexible resource (as described in connection with FIG. 3) and/or from a cancellation indication for a PUSCH on which HARQ feedback is to be multiplexed (as described in connection with FIG. 4). As a result of such ambiguities, the base station 110 may need to simultaneously (e.g., parallel in time) monitor a quantity of PUCCH resources corresponding to a quantity of HARQ codebooks that are cancelled. This may increase a processing burden at the base station 110 as well as increase uplink resource consumption (e.g., in connection with uplink resource reservation for the quantity of PUCCH resources).

In some techniques and apparatuses described herein, a UE 120 may indicate (e.g., to a network, via a base station 110) whether the transmission of a HARQ codebook is cancelled. That is, the UE 120 may provide an indication that the transmission of a HARQ codebook is cancelled if transmission of a HARQ codebook is dropped in favor of a HARQ codebook associated with a higher priority downlink transmission (as described in connection with FIG. 5), if a PUSCH on which a HARQ codebook is to be multiplexed is cancelled (as described in connection with FIG. 4), and/or if transmission of a HARQ codebook is deferred due to collision of an uplink resource with a downlink or flexible resource resulting from a slot format change (as described in connection with FIG. 3). The UE 120 may provide the indication of whether the transmission of a HARQ codebook is cancelled in UCI. In this way, the ambiguities described above are resolved, thereby conserving processing resources of the base station 110 and/or conserving network resources.

As indicated above, FIG. 6 is provided as an example. Other examples may differ from what is described with respect to FIG. 6.

Figure 7:
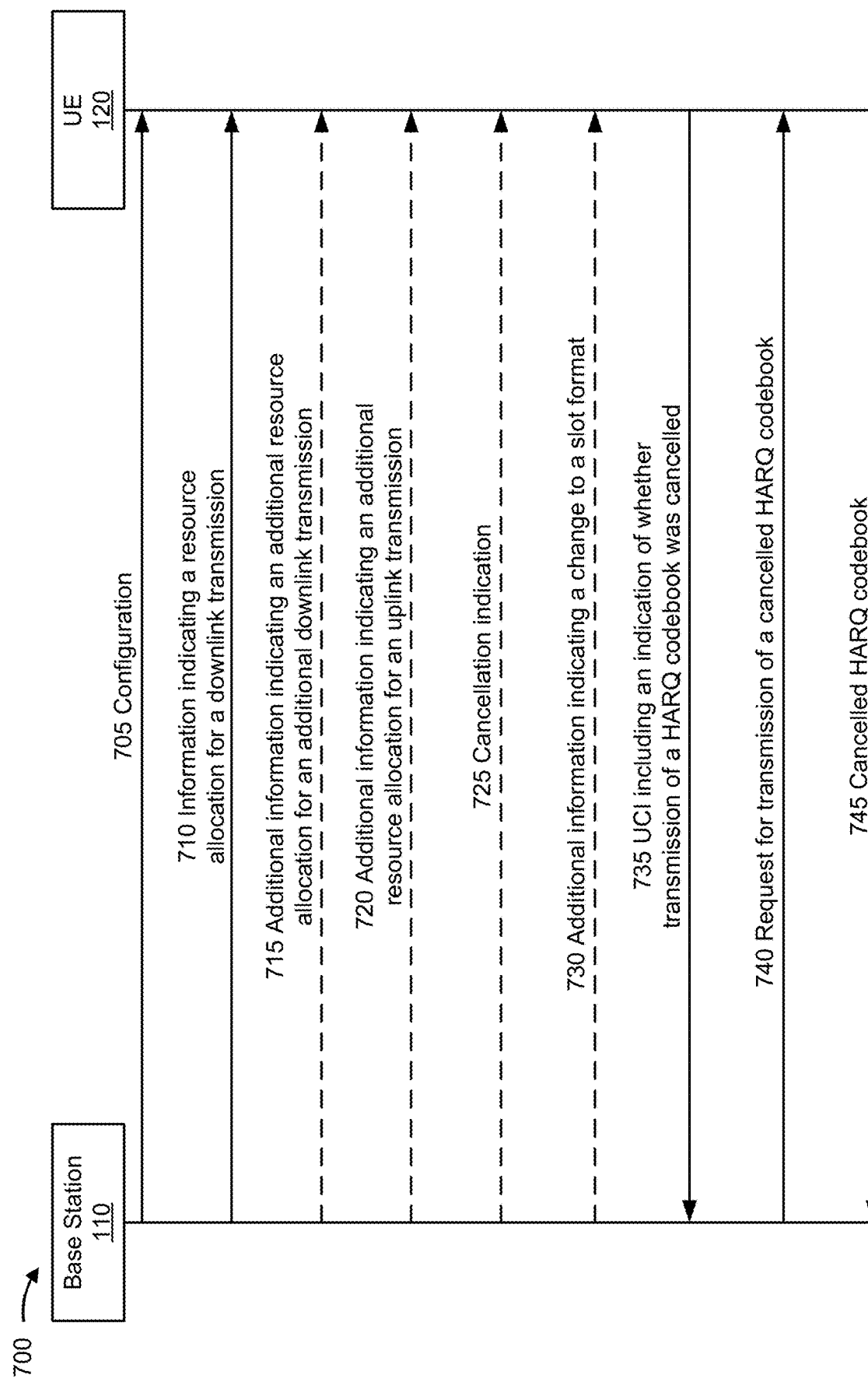
FIG. 7 is a diagram illustrating an example associated with indication of a cancelled HARQ codebook, in accordance with the present disclosure.

FIG. 7 is a diagram illustrating an example 700 associated with indication of a cancelled HARQ codebook, in accordance with the present disclosure. As shown in FIG. 7, a base station 110 and a UE 120 may communicate with one another.

As shown by reference number 705, the base station 110 may transmit, and the UE 120 may receive, a configuration for the UE 120. The configuration may be an RRC configuration (or re-configuration). The configuration may indicate whether the UE 120 is to include a field for indication of a cancelled HARQ codebook in UCI. For example, if the UE 120 is configured by RRC signaling to include the field in UCI, then the UE 120 is to always include the field in UCI (e.g., regardless of whether the UE 120 has cancelled HARQ codebooks and/or regardless of whether the UCI includes HARQ feedback).

As shown by reference number 710, the base station 110 may transmit, and the UE 120 may receive, information indicating a resource allocation for a downlink transmission to the UE 120. The information may also indicate an uplink resource (e.g., a time and frequency resource) for transmission of UCI including a HARQ codebook. The HARQ codebook may be for HARQ feedback for the downlink transmission. The information may indicate the uplink resource by a PRI and/or by a PDSCH-to-HARQ feedback timing value (K1), among other examples. In some implementations, the information may be DCI. In some aspects, the information may be an SPS configuration or DCI activating the SPS configuration. Here, the resource allocation for the downlink transmission may be a periodic SPS PDSCH, and the uplink resource may be a periodic SPS PUCCH.

In some aspects, the information, or any of the additional information described below, may indicate whether the UE 120 is to include a field for indication of cancelled HARQ codebooks in UCI (e.g., if this is not RRC configured for the UE 120). For example, the information may indicate whether the UE 120 is to include the field using a single bit. In some aspects, the base station 110 may transmit, and the UE 120 may receive, a configuration for at least a first DCI size (e.g., 10 bits) and a second DCI size that includes an additional bit relative to the first DCI size (e.g., 11 bits). For example, typically, the UE 120 may be configured to monitor up to four different DCI sizes (e.g., 10 bits, 12 bits, 14 bits, and 20 bits). If an additional bit is included in DCI (e.g., to indicate whether the UE 120 is to include the field), then the UE 120 may be configured to monitor up to four more (e.g., for a total of up to eight) different DCI sizes (e.g., 11 bits, 13 bits, 15 bits, and 21 bits). Alternatively, the UE 120 may receive, from the base station 110, an instruction to apply blind decoding for at least a first DCI size (e.g., 10 bits) and a second DCI size that includes an additional bit relative to the first DCI size (e.g., 11 bits).

As shown by reference number 715, in some aspects, the base station 110 may transmit, and the UE 120 may receive, additional information (e.g., additional DCI) that indicates an additional resource allocation for an additional downlink transmission to the UE 120 and an additional uplink resource for transmission of UCI including an additional HARQ codebook, in a similar manner as described in connection with FIGS. 5-6. The additional downlink transmission may be associated with a higher priority than a priority associated with the downlink transmission. Moreover, the additional uplink resource may overlap in time with the uplink resource (e.g., and may be insufficient for transmission of the HARQ codebook and the additional HARQ codebook). Thus, the UE 120 may determine to drop transmission of the HARQ codebook. That is, transmission of the HARQ codebook may be cancelled at the UE 120 if the additional uplink resource overlaps in time with the uplink resource, and the additional downlink transmission is associated with a higher priority than a priority associated with the downlink transmission.

As shown by reference number 720, in some aspects, the base station 110 may transmit, and the UE 120 may receive, additional information (e.g., additional DCI) that indicates an additional resource allocation for an uplink transmission (e.g., in a PUSCH) from the UE 120 and indicates that the UCI (e.g., the HARQ codebook), described in connection with reference number 710, is to be multiplexed on the PUSCH, in a similar manner as described in connection with FIG. 4. As shown by reference number 725, in some aspects, the base station 110 may transmit, and the UE 120 may receive, a cancellation indication (e.g., in DCI) for the PUSCH for multiplexing the UCI (e.g., for multiplexing the HARQ codebook). Thus, the UE 120 may determine to cancel transmission of the HARQ codebook. That is, transmission of the HARQ codebook may be cancelled at the UE 120 based at least in part on the cancellation indication.

As shown by reference number 730, in some aspects, the base station 110 may transmit, and the UE 120 may receive, additional information indicating a change to a slot format used by the UE 120, in a similar manner as described in connection with FIG. 3. The information may include a slot format indicator (SFI) (e.g., indicated in DCI) and/or a configuration of a slot format (e.g., provided in an RRC configuration). The change to the slot format may result in collision (e.g., in time resources) of the uplink resource for the UCI (e.g., for the HARQ codebook), described in connection with reference number 710, with downlink resources or flexible resources (e.g., flexible resources scheduled for downlink) of the new slot format. For example, as described above, the uplink resource may be an SPS PUCCH occasion. Thus, the UE 120 may determine to defer or delay transmission of the HARQ codebook. That is, transmission of the HARQ codebook may be cancelled at the UE 120 if the change to the slot format results in collision of the uplink resource for the HARQ codebook with downlink or flexible resources.

As shown by reference number 735, the UE 120 may transmit, and the base station 110 may receive, UCI that includes an indication of whether transmission of a HARQ codebook was cancelled. For example, the indication may indicate that transmission of the HARQ codebook was cancelled based at least in part on the higher priority downlink transmission (described in connection with reference number 715), the cancellation indication (described in connection with reference number 725), and/or the information indicating the change to the slot format (described in connection with reference number 730).

The UCI transmitted by the UE 120 may include one or more fields indicated by 3GPP Release 16 of 5G/NR. For example, the UCI may include HARQ feedback (other than the HARQ codebook that was cancelled). The indication of whether transmission of the HARQ codebook was cancelled may include one bit of the UCI transmitted by the UE 120. For example, a bit used for the indication may be appended to the one or more fields of the UCI. The bit may have a value of 0 to indicate that there are no HARQ codebooks cancelled at the UE 120. The bit may have a value of 1 to indicate that there is at least one HARQ codebook cancelled at the UE 120. Thus, the indication may indicate whether one or more HARQ codebooks (e.g., the HARQ codebook and/or one or more additional HARQ codebooks) were cancelled at the UE 120. That is, the indication may be applicable to one or more HARQ codebooks. The UE 120 may include the bit in the UCI even if the UCI does not contain HARQ feedback (e.g., the UE 120 may always include the bit in UCI).

The UE 120 may transmit the UCI in a PUCCH or a PUSCH. In other words, the UE 120 may include the indication in each PUCCH or in each PUSCH (that includes UCI) transmitted by the UE 120 (e.g., for which the UE 120 receives scheduling). For example, in example 600 of FIG. 6, the UE 120 may include an indication, in the UCI including the HARQ codebook 620, indicating that there is no cancelled HARQ codebook (e.g., because the HARQ codebook 615 is not transmitted due to missed DCI, rather than being dropped), and the UE 120 may include an indication, in the UCI including the HARQ codebook 640, indicating that there is a cancelled HARQ codebook (e.g., because the HARQ codebook 635 is dropped).

The base station 110 may monitor for particular events in order to interpret an indication that there is a cancelled HARQ codebook. If the base station 110 receives a HARQ codebook in UCI after scheduling a lower priority downlink transmission and a higher priority downlink transmission (as described in connection with reference number 715), then the base station 110 may determine that transmission of the HARQ codebook associated with the lower priority downlink transmission was cancelled (e.g., was dropped due to intra-UE multiplexing). If the base station 110 transmits a cancellation indication for a PUSCH on which a HARQ codebook is to be multiplexed (as described in connection with reference number 725), then the base station 110 may determine that transmission of the HARQ codebook was cancelled. If the base station 110 transmits information indicating a change to a slot format resulting in a collision of an SPS PUCCH for a HARQ codebook and downlink or flexible resources (as described in connection with reference number 730), then the base station 110 may determine that transmission of the HARQ codebook was cancelled (e.g., deferred or delayed).

Interpretation of an indication that there is a cancelled HARQ codebook by the base station 110 may be facilitated by one or more rules that are applied at the base station 110 and/or the UE 120. According to a first rule, HARQ codebooks (e.g., associated with a lower priority downlink transmission and a higher priority downlink transmission) are not to be multiplexed at an uplink transmission occasion (e.g., a first uplink transmission occasion) after an uplink transmission (e.g., a PUSCH) is cancelled by reception of a cancellation indication. According to a second rule, HARQ codebooks (e.g., associated with a lower priority downlink transmission and a higher priority downlink transmission) are not to be multiplexed at an uplink transmission occasion (e.g., a first uplink transmission occasion) after a slot format change resulting in a collision of an SPS PUCCH for a HARQ codebook and downlink or flexible resources. According to a third rule, a cancellation indication is not to be provided for an SPS PUCCH for a HARQ codebook that collides with downlink or flexible resources.

As shown by reference number 740, the base station 110 may transmit, and the UE 120 may receive, a request (e.g., in DCI) for transmission of a cancelled HARQ codebook. The request may be for an earliest cancelled HARQ codebook, a latest (e.g., most recent) cancelled HARQ codebook, or a particular (e.g., an Nth) cancelled HARQ codebook. As shown by reference number 745, the UE 120 may transmit (e.g., in response to the request), and the base station 110 may receive, the cancelled HARQ codebook. For example, the UE 120 may transmit the cancelled HARQ codebook using the uplink resource that was originally indicated (e.g., by a PRI) for transmission of the HARQ codebook (e.g., the uplink resource described in connection with reference number 710). In accordance with the indication(s) received by the base station 110, the base station 110 may identify the HARQ codebook that is transmitted by the UE 120. Thus, the base station 110 may identify the uplink resource in which the HARQ codebook is transmitted.

As indicated above, FIG. 7 is provided as an example. Other examples may differ from what is described with respect to FIG. 7.

Figure 8:
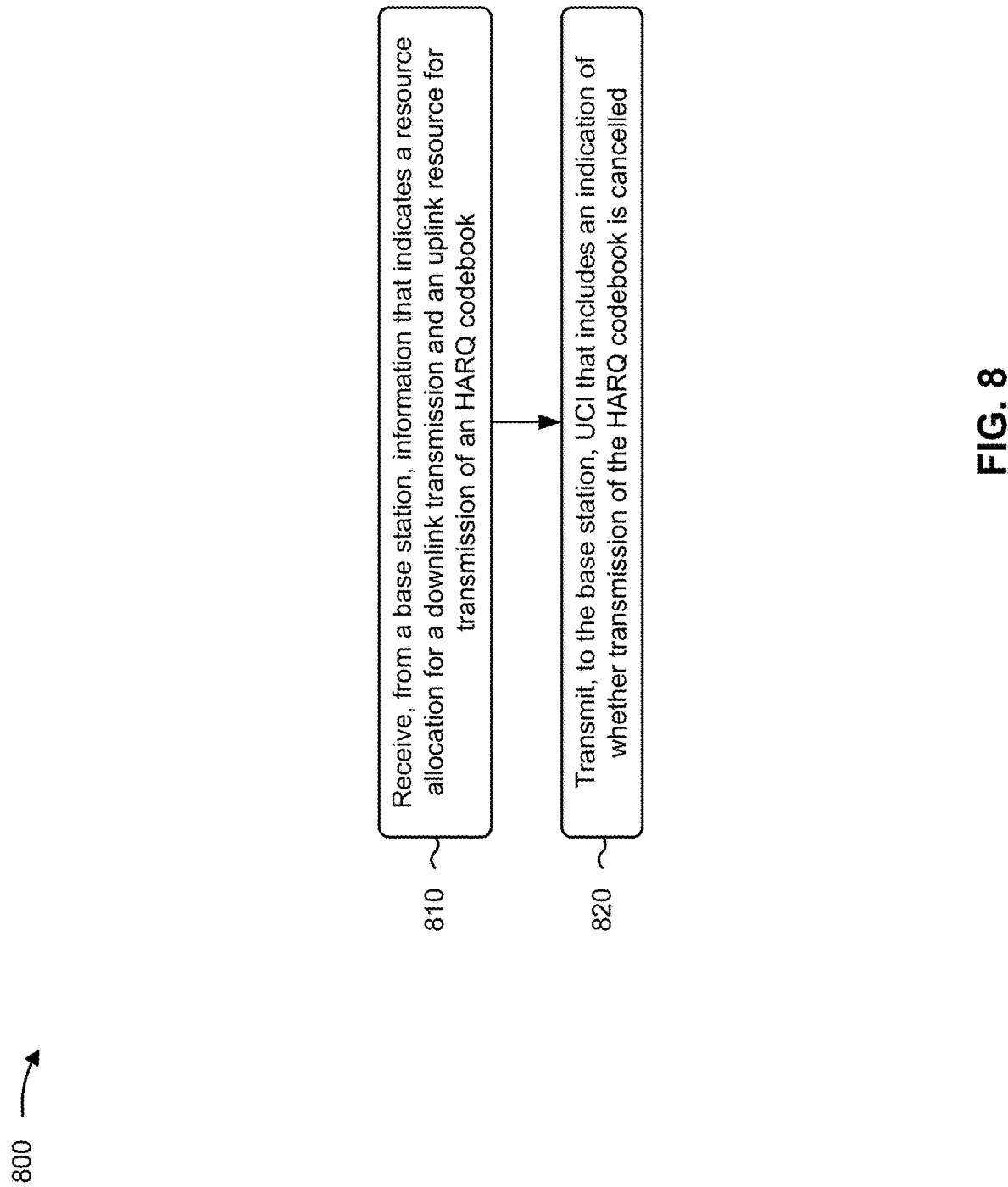
FIGS. 8-9 are diagrams illustrating example processes associated with indication of a cancelled HARQ codebook, in accordance with the present disclosure.

FIG. 8 is a diagram illustrating an example process 800 performed, for example, by a UE, in accordance with the present disclosure. Example process 800 is an example where the UE (e.g., UE 120) performs operations associated with indication of a cancelled HARQ codebook.

As shown in FIG. 8, in some aspects, process 800 may include receiving, from a base station, information that indicates a resource allocation for a downlink transmission and an uplink resource for transmission of an HARQ codebook (block 810). For example, the UE (e.g., using communication manager 140 and/or reception component 1002, depicted in FIG. 8) may receive, from a base station, information that indicates a resource allocation for a downlink transmission and an uplink resource for transmission of an HARQ codebook, as described above.

As further shown in FIG. 8, in some aspects, process 800 may include transmitting, to the base station, UCI that includes an indication of whether transmission of the HARQ codebook is cancelled (block 820). For example, the UE (e.g., using communication manager 140 and/or transmission component 1004, depicted in FIG. 8) may transmit, to the base station, UCI that includes an indication of whether transmission of the HARQ codebook is cancelled, as described above.

Process 800 may include additional aspects, such as any single aspect or any combination of aspects described below and/or in connection with one or more other processes described elsewhere herein.

In a first aspect, process 800 includes receiving (e.g., using communication manager 140 and/or reception component 1002) additional information that indicates another resource allocation for an additional downlink transmission, wherein transmission of the HARQ codebook is cancelled if another uplink resource indicated by the additional information overlaps in time with the uplink resource, and the additional downlink transmission is associated with a higher priority than a priority associated with the downlink transmission.

In a second aspect, alone or in combination with the first aspect, process 800 includes receiving (e.g., using communication manager 140 and/or reception component 1002) additional information that indicates an additional resource allocation for a PUSCH for multiplexing the HARQ codebook, and receiving (e.g., using communication manager 140 and/or reception component 1002) a cancellation indication for the PUSCH, wherein transmission of the HARQ codebook is cancelled based at least in part on the cancellation indication.

In a third aspect, alone or in combination with one or more of the first and second aspects, according to a rule, the UE is not to multiplex HARQ codebooks in a first uplink transmission occasion after receiving the cancellation indication.

In a fourth aspect, alone or in combination with one or more of the first through third aspects, process 800 includes receiving (e.g., using communication manager 140 and/or reception component 1002) additional information indicating a change to a slot format, wherein transmission of the HARQ codebook is cancelled if the change to the slot format results in the uplink resource colliding with one or more downlink or flexible resources.

In a fifth aspect, alone or in combination with one or more of the first through fourth aspects, according to a rule, the UE is not to multiplex HARQ codebooks in a first uplink transmission occasion after the change to the slot format.

In a sixth aspect, alone or in combination with one or more of the first through fifth aspects, according to a rule, the UE is not to receive a cancellation indication for the uplink resource for transmission of the HARQ codebook if the change to the slot format results in the uplink resource colliding with the one or more downlink or flexible resources.

In a seventh aspect, alone or in combination with one or more of the first through sixth aspects, process 800 includes receiving (e.g., using communication manager 140 and/or reception component 1002) a request for transmission of a cancelled HARQ codebook, and transmitting (e.g., using communication manager 140 and/or transmission component 1004) the HARQ codebook.

In an eighth aspect, alone or in combination with one or more of the first through seventh aspects, process 800 includes receiving (e.g., using communication manager 140 and/or reception component 1002), via radio resource control signaling, a configuration indicating that the indication is to be included in the UCI.

In a ninth aspect, alone or in combination with one or more of the first through eighth aspects, the indication of whether transmission of the HARQ codebook is cancelled is applicable to one or more HARQ codebooks.

In a tenth aspect, alone or in combination with one or more of the first through ninth aspects, process 800 includes receiving (e.g., using communication manager 140 and/or reception component 1002) a configuration for at least a first DCI size and a second DCI size that includes an additional bit relative to the first DCI size.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
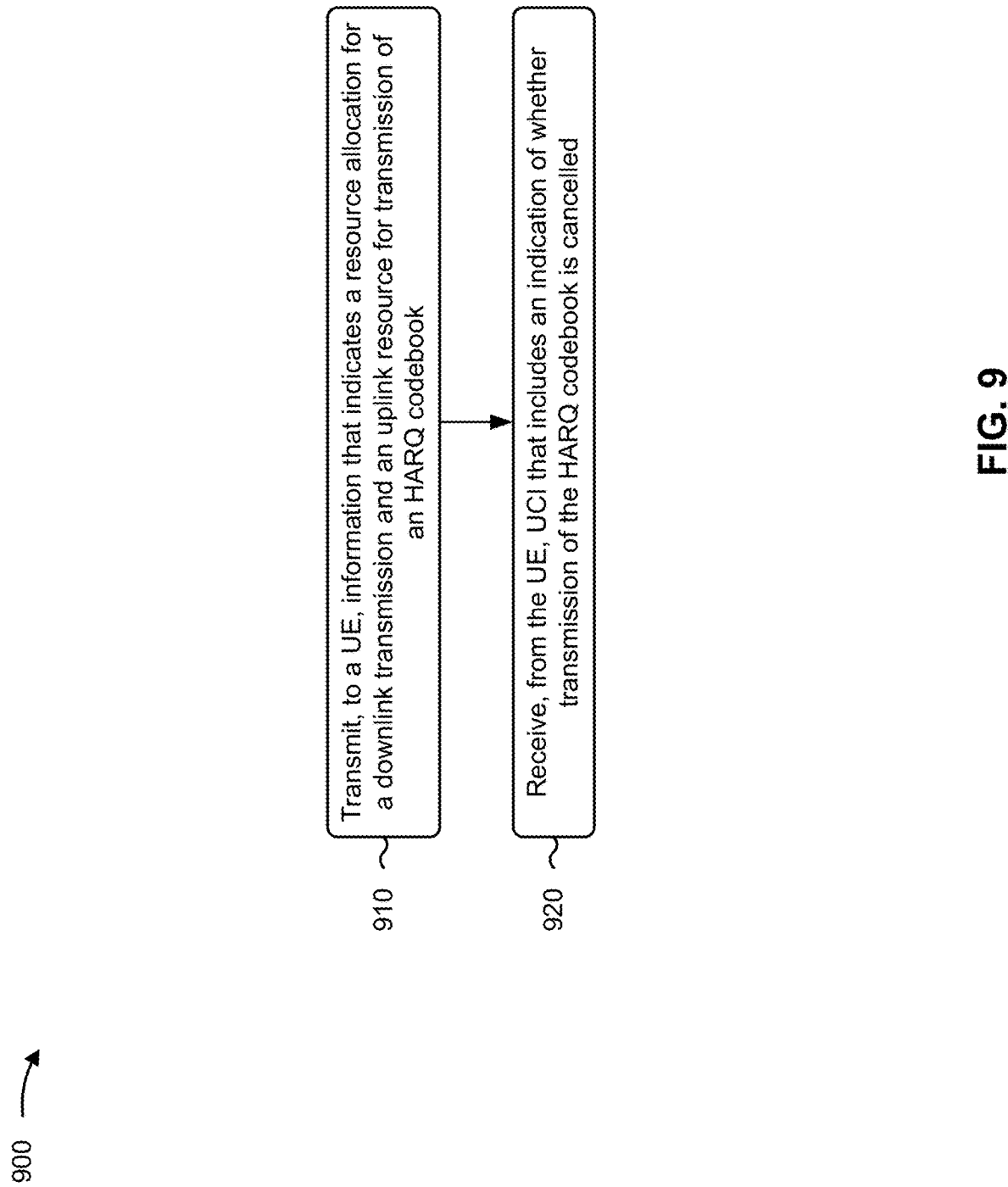

FIG. 9 is a diagram illustrating an example process 900 performed, for example, by a base station, in accordance with the present disclosure. Example process 900 is an example where the base station (e.g., base station 110) performs operations associated with indication of a cancelled HARQ codebook.

As shown in FIG. 9, in some aspects, process 900 may include transmitting, to a UE, information that indicates a resource allocation for a downlink transmission and an uplink resource for transmission of an HARQ codebook (block 910). For example, the base station (e.g., using communication manager 150 and/or transmission component 1104, depicted in FIG. 9) may transmit, to a UE, information that indicates a resource allocation for a downlink transmission and an uplink resource for transmission of an HARQ codebook, as described above.

As further shown in FIG. 9, in some aspects, process 900 may include receiving, from the UE, UCI that includes an indication of whether transmission of the HARQ codebook is cancelled (block 920). For example, the base station (e.g., using communication manager 150 and/or reception component 1102, depicted in FIG. 9) may receive, from the UE, UCI that includes an indication of whether transmission of the HARQ codebook is cancelled, as described above.

Process 900 may include additional aspects, such as any single aspect or any combination of aspects described below and/or in connection with one or more other processes described elsewhere herein.

In a first aspect, process 900 includes transmitting (e.g., using communication manager 150 and/or transmission component 1104) additional information that indicates another resource allocation for an additional downlink transmission, wherein transmission of the HARQ codebook is cancelled if another uplink resource indicated by the additional information overlaps in time with the uplink resource, and the additional downlink transmission is associated with a higher priority than a priority associated with the downlink transmission.

In a second aspect, alone or in combination with the first aspect, process 900 includes transmitting (e.g., using communication manager 150 and/or transmission component 1104) additional information that indicates an additional resource allocation for a PUSCH for multiplexing the HARQ codebook, and transmitting (e.g., using communication manager 150 and/or transmission component 1104) a cancellation indication for the PUSCH, wherein transmission of the HARQ codebook is cancelled based at least in part on the cancellation indication.

In a third aspect, alone or in combination with one or more of the first and second aspects, according to a rule, the UE is not to multiplex HARQ codebooks in a first uplink transmission occasion after receiving the cancellation indication.

In a fourth aspect, alone or in combination with one or more of the first through third aspects, process 900 includes transmitting (e.g., using communication manager 150 and/or transmission component 1104) additional information indicating a change to a slot format, wherein transmission of the HARQ codebook is cancelled if the change to the slot format results in the uplink resource colliding with one or more downlink or flexible resources.

In a fifth aspect, alone or in combination with one or more of the first through fourth aspects, according to a rule, the UE is not to multiplex HARQ codebooks in a first uplink transmission occasion after the change to the slot format.

In a sixth aspect, alone or in combination with one or more of the first through fifth aspects, according to a rule, the base station is not to transmit a cancellation indication for the uplink resource for transmission of the HARQ codebook if the change to the slot format results in the uplink resource colliding with the one or more downlink or flexible resources.

In a seventh aspect, alone or in combination with one or more of the first through sixth aspects, process 900 includes transmitting (e.g., using communication manager 150 and/or transmission component 1104) a request for transmission of a cancelled HARQ codebook, and receiving (e.g., using communication manager 150 and/or reception component 1102) the HARQ codebook.

In an eighth aspect, alone or in combination with one or more of the first through seventh aspects, process 900 includes transmitting (e.g., using communication manager 150 and/or transmission component 1104), via radio resource control signaling, a configuration indicating that the indication is to be included in the UCI.

In a ninth aspect, alone or in combination with one or more of the first through eighth aspects, the indication of whether transmission of the HARQ codebook is cancelled is applicable to one or more HARQ codebooks.

In a tenth aspect, alone or in combination with one or more of the first through ninth aspects, process 900 includes transmitting (e.g., using communication manager 150 and/or transmission component 1104) a configuration for at least a first DCI size and a second DCI size that includes an additional bit relative to the first DCI size.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
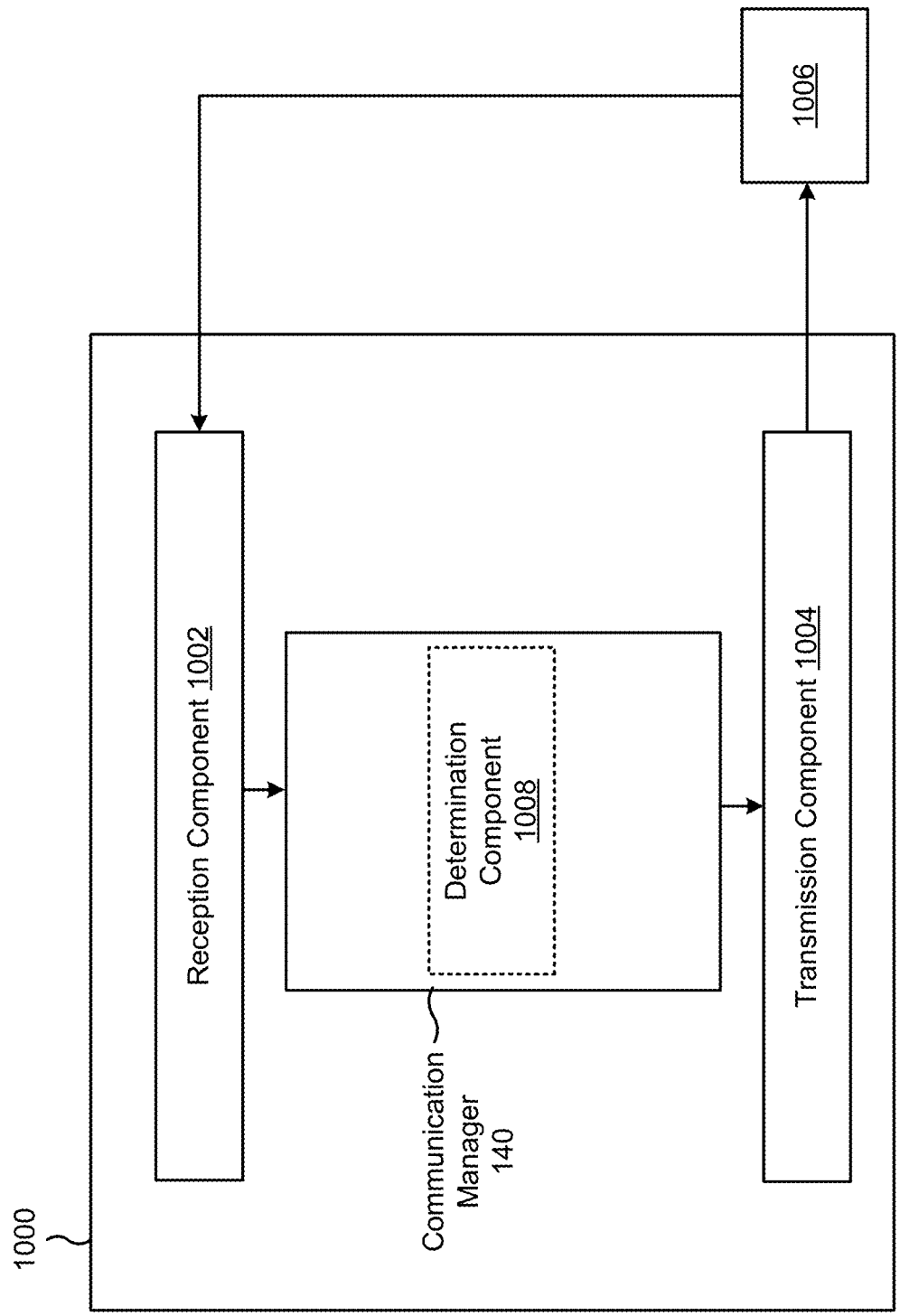
FIGS. 10-11 are diagrams of example apparatuses for wireless communication, in accordance with the present disclosure.

FIG. 10 is a diagram of an example apparatus 1000 for wireless communication. The apparatus 1000 may be a UE, or a UE may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include the communication manager 140. The communication manager 140 may include a determination component 1008, among other examples.

In some aspects, the apparatus 1000 may be configured to perform one or more operations described herein in connection with FIG. 7. Additionally, or alternatively, the apparatus 1000 may be configured to perform one or more processes described herein, such as process 800 of FIG. 8, or a combination thereof. In some aspects, the apparatus 1000 and/or one or more components shown in FIG. 10 may include one or more components of the UE described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1006. In some aspects, the reception component 1002 may include one or more antennas, a modem, a demodulator, a MIMO detector, a receive processor, a controller/processor, a memory, or a combination thereof, of the UE described in connection with FIG. 2.

The transmission component 1004 may transmit communications, such as reference signals, control information, data communications, or a combination thereof, to the apparatus 1006. In some aspects, one or more other components of the apparatus 1006 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the UE described in connection with FIG. 2. In some aspects, the transmission component 1004 may be co-located with the reception component 1002 in a transceiver.

The reception component 1002 may receive, from a base station, information that indicates a resource allocation for a downlink transmission and an uplink resource for transmission of an HARQ codebook. The transmission component 1004 may transmit, to the base station, UCI that includes an indication of whether transmission of the HARQ codebook is cancelled.

The reception component 1002 may receive additional information that indicates another resource allocation for an additional downlink transmission. The determination component 1008 may determine that transmission of the HARQ codebook is to be cancelled if another uplink resource indicated by the additional information overlaps in time with the uplink resource, and the additional downlink transmission is associated with a higher priority than a priority associated with the downlink transmission.

The reception component 1002 may receive additional information that indicates an additional resource allocation for a PUSCH for multiplexing the HARQ codebook. The reception component 1002 may receive a cancellation indication for the PUSCH. The determination component 1008 may determine that transmission of the HARQ codebook is to be cancelled based at least in part on the cancellation indication.

The reception component 1002 may receive additional information indicating a change to a slot format. The determination component 1008 may determine that transmission of the HARQ codebook is to be cancelled if the change to the slot format results in the uplink resource colliding with one or more downlink or flexible resources.

The reception component 1002 may receive a request for transmission of a cancelled HARQ codebook. The transmission component 1004 may transmit the HARQ codebook.

The reception component 1002 may receive, via radio resource control signaling, a configuration indicating that the indication is to be included in the UCI.

The reception component 1002 may receive a configuration for at least a first DCI size and a second DCI size that includes an additional bit relative to the first DCI size.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

Figure 11:
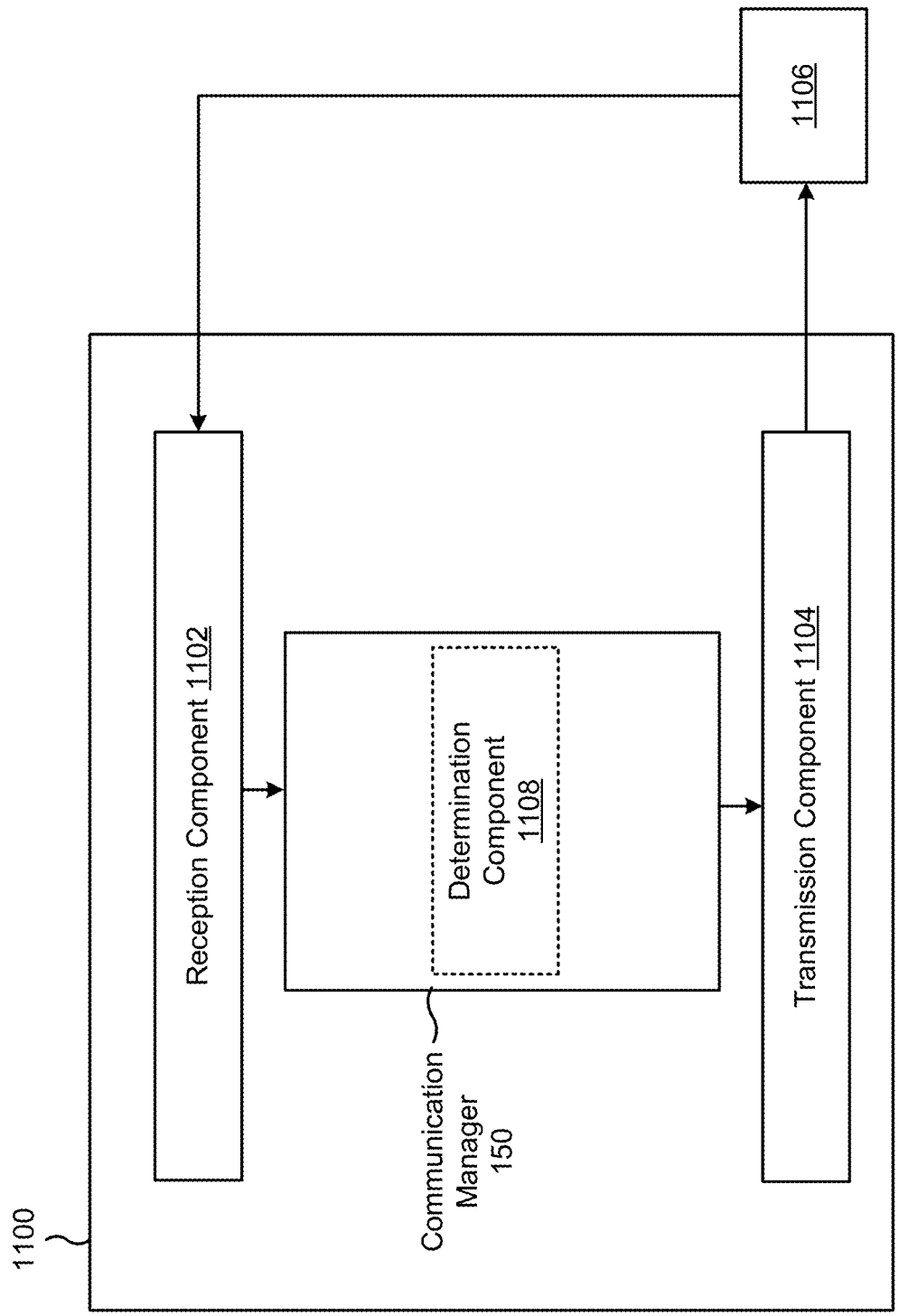

FIG. 11 is a diagram of an example apparatus 1100 for wireless communication. The apparatus 1100 may be a base station, or a base station may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include the communication manager 150. The communication manager 150 may include a determination component 1108, among other examples.

In some aspects, the apparatus 1100 may be configured to perform one or more operations described herein in connection with FIG. 7. Additionally, or alternatively, the apparatus 1100 may be configured to perform one or more processes described herein, such as process 900 of FIG. 9, or a combination thereof. In some aspects, the apparatus 1100 and/or one or more components shown in FIG. 11 may include one or more components of the base station described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1106. In some aspects, the reception component 1102 may include one or more antennas, a modem, a demodulator, a MIMO detector, a receive processor, a controller/processor, a memory, or a combination thereof, of the base station described in connection with FIG. 2.

The transmission component 1104 may transmit communications, such as reference signals, control information, data communications, or a combination thereof, to the apparatus 1106. In some aspects, one or more other components of the apparatus 1106 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modem, a modulator, a transmit MIMO processor, a transmit processor, a controller/processor, a memory, or a combination thereof, of the base station described in connection with FIG. 2. In some aspects, the transmission component 1104 may be co-located with the reception component 1102 in a transceiver.

The transmission component 1104 may transmit, to a UE, information that indicates a resource allocation for a downlink transmission and an uplink resource for transmission of an HARQ codebook. The reception component 1102 may receive, from the UE, UCI that includes an indication of whether transmission of the HARQ codebook is cancelled.

The transmission component 1104 may transmit additional information that indicates another resource allocation for an additional downlink transmission. In some aspects, transmission of the HARQ codebook is cancelled if another uplink resource indicated by the additional information overlaps in time with the uplink resource, and the additional downlink transmission is associated with a higher priority than a priority associated with the downlink transmission.

The transmission component 1104 may transmit additional information that indicates an additional resource allocation for a PUSCH for multiplexing the HARQ codebook. The transmission component 1104 may transmit a cancellation indication for the PUSCH. In some aspects, transmission of the HARQ codebook is cancelled based at least in part on the cancellation indication.

The transmission component 1104 may transmit additional information indicating a change to a slot format. In some aspects, transmission of the HARQ codebook is cancelled if the change to the slot format results in the uplink resource colliding with one or more downlink or flexible resources.

The transmission component 1104 may transmit a request for transmission of a cancelled HARQ codebook. The reception component 1102 may receive the HARQ codebook.

The transmission component 1104 may transmit, via radio resource control signaling, a configuration indicating that the indication is to be included in the UCI.

The transmission component 1104 may transmit a configuration for at least a first DCI size and a second DCI size that includes an additional bit relative to the first DCI size.

The determination component 1108 may determine, according to a rule, that the UE is not to multiplex HARQ codebooks in a first uplink transmission occasion after receiving the cancellation indication. The determination component 1108 may determine, according to a rule, that the UE is not to multiplex HARQ codebooks in a first uplink transmission occasion after the change to the slot format. The determination component 1108 may determine, according to a rule, that the cancellation indication is not to be transmitted for the uplink resource for transmission of the HARQ codebook if the change to the slot format results in the uplink resource colliding with the one or more downlink or flexible resources.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

The following provides an overview of some Aspects of the present disclosure:

Aspect 1: A method of wireless communication performed by a user equipment (UE), comprising: receiving, from a base station, information that indicates a resource allocation for a downlink transmission and an uplink resource for transmission of a hybrid automatic repeat request (HARQ) codebook; and transmitting, to the base station, uplink control information (UCI) that includes an indication of whether transmission of the HARQ codebook is cancelled.

Aspect 2: The method of Aspect 1, further comprising: receiving additional information that indicates another resource allocation for an additional downlink transmission, wherein transmission of the HARQ codebook is cancelled if another uplink resource indicated by the additional information overlaps in time with the uplink resource, and the additional downlink transmission is associated with a higher priority than a priority associated with the downlink transmission.

Aspect 3: The method of any of Aspects 1-2, further comprising: receiving additional information that indicates an additional resource allocation for a physical uplink shared channel (PUSCH) for multiplexing the HARQ codebook; and receiving a cancellation indication for the PUSCH, wherein transmission of the HARQ codebook is cancelled based at least in part on the cancellation indication.

Aspect 4: The method of Aspect 3, wherein, according to a rule, the UE is not to multiplex HARQ codebooks in a first uplink transmission occasion after receiving the cancellation indication.

Aspect 5: The method of any of Aspects 1-4, further comprising: receiving additional information indicating a change to a slot format, wherein transmission of the HARQ codebook is cancelled if the change to the slot format results in the uplink resource colliding with one or more downlink or flexible resources.

Aspect 6: The method of Aspect 5, wherein according to a rule, the UE is not to multiplex HARQ codebooks in a first uplink transmission occasion after the change to the slot format.

Aspect 7: The method of any of Aspects 5-6, wherein, according to a rule, the UE is not to receive a cancellation indication for the uplink resource for transmission of the HARQ codebook if the change to the slot format results in the uplink resource colliding with the one or more downlink or flexible resources.

Aspect 8: The method of any of Aspects 1-7, further comprising: receiving a request for transmission of a cancelled HARQ codebook; and transmitting the HARQ codebook.

Aspect 9: The method of any of Aspects 1-8, further comprising: receiving, via radio resource control signaling, a configuration indicating that the indication is to be included in the UCI.

Aspect 10: The method of any of Aspects 1-9, wherein the indication of whether transmission of the HARQ codebook is cancelled is applicable to one or more HARQ codebooks.

Aspect 11: The method of any of Aspects 1-10, further comprising: receiving a configuration for at least a first downlink control information (DCI) size and a second DCI size that includes an additional bit relative to the first DCI size.

Aspect 12: A method of wireless communication performed by a base station, comprising: transmitting, to a user equipment (UE), information that indicates a resource allocation for a downlink transmission and an uplink resource for transmission of a hybrid automatic repeat request (HARQ) codebook; and receiving, from the UE, uplink control information (UCI) that includes an indication of whether transmission of the HARQ codebook is cancelled.

Aspect 13: The method of Aspect 12, further comprising: transmitting additional information that indicates an additional resource allocation for an additional downlink transmission and an additional uplink resource for transmission of an additional HARQ codebook, wherein transmission of the HARQ codebook is canceled if the additional uplink resource overlaps in time with the uplink resource, and the additional downlink transmission is associated with a higher priority than a priority associated with the downlink transmission.

Aspect 14: The method of any of Aspects 12-13, further comprising: transmitting additional information that indicates an additional resource allocation for a physical uplink shared channel (PUSCH) for multiplexing the HARQ codebook; and transmitting a cancellation indication for the PUSCH, wherein transmission of the HARQ codebook is cancelled based at least in part on the cancellation indication.

Aspect 15: The method of Aspect 14, wherein, according to a rule, the UE is not to multiplex HARQ codebooks in a first uplink transmission occasion after receiving the cancellation indication.

Aspect 16: The method of any of Aspects 12-15, further comprising: transmitting additional information indicating a change to a slot format, wherein transmission of the HARQ codebook is cancelled if the change to the slot format results in the uplink resource colliding with one or more downlink or flexible resources.

Aspect 17: The method of Aspect 16, wherein according to a rule, the UE is not to multiplex HARQ codebooks in a first uplink transmission occasion after the change to the slot format.

Aspect 18: The method of any of Aspects 16-17, wherein, according to a rule, the base station is not to transmit a cancellation indication for the uplink resource for transmission of the HARQ codebook if the change to the slot format results in the uplink resource colliding with the one or more downlink or flexible resources.

Aspect 19: The method of Aspect 12, further comprising: transmitting a request for transmission of a cancelled HARQ codebook; and receiving the HARQ codebook.

Aspect 20: The method of any of Aspects 12-19, further comprising: transmitting, via radio resource control signaling, a configuration indicating that the indication is to be included in the UCI.

Aspect 21: The method of any of Aspects 12-20, wherein the indication of whether transmission of the HARQ codebook is cancelled is applicable to one or more HARQ codebooks.

Aspect 22: The method of any of Aspects 12-21, further comprising: transmitting a configuration for at least a first downlink control information (DCI) size and a second DCI size that includes an additional bit relative to the first DCI size.

Aspect 23: An apparatus for wireless communication at a device, comprising a processor; memory coupled with the processor; and instructions stored in the memory and executable by the processor to cause the apparatus to perform the method of one or more of Aspects 1-11.

Aspect 24: A device for wireless communication, comprising a memory and one or more processors coupled to the memory, the one or more processors configured to perform the method of one or more of Aspects 1-11.

Aspect 25: An apparatus for wireless communication, comprising at least one means for performing the method of one or more of Aspects 1-11.

Aspect 26: A non-transitory computer-readable medium storing code for wireless communication, the code comprising instructions executable by a processor to perform the method of one or more of Aspects 1-11.

Aspect 27: A non-transitory computer-readable medium storing a set of instructions for wireless communication, the set of instructions comprising one or more instructions that, when executed by one or more processors of a device, cause the device to perform the method of one or more of Aspects 1-11.

Aspect 28: An apparatus for wireless communication at a device, comprising a processor; memory coupled with the processor; and instructions stored in the memory and executable by the processor to cause the apparatus to perform the method of one or more of Aspects 12-22.

Aspect 29: A device for wireless communication, comprising a memory and one or more processors coupled to the memory, the one or more processors configured to perform the method of one or more of Aspects 12-22.

Aspect 30: An apparatus for wireless communication, comprising at least one means for performing the method of one or more of Aspects 12-22.

Aspect 31: A non-transitory computer-readable medium storing code for wireless communication, the code comprising instructions executable by a processor to perform the method of one or more of Aspects 12-22.

Aspect 32: A non-transitory computer-readable medium storing a set of instructions for wireless communication, the set of instructions comprising one or more instructions that, when executed by one or more processors of a device, cause the device to perform the method of one or more of Aspects 12-22.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:
 a memory; and
 one or more processors, coupled to the memory, configured to:
  receive, from a base station, information that indicates a resource allocation for a downlink transmission and an uplink resource for transmission of a hybrid automatic repeat request (HARQ) codebook; and
  transmit, to the base station, uplink control information (UCI) that includes an indication of whether transmission of the HARQ codebook is cancelled.

2. The apparatus of claim 1, wherein the one or more processors are further configured to:
 receive additional information that indicates another resource allocation for an additional downlink transmission,
  wherein transmission of the HARQ codebook is cancelled if another uplink resource indicated by the additional information overlaps in time with the uplink resource, and the additional downlink transmission is associated with a higher priority than a priority associated with the downlink transmission.

3. The apparatus of claim 1, wherein the one or more processors are further configured to:
 receive additional information that indicates an additional resource allocation for a physical uplink shared channel (PUSCH) for multiplexing the HARQ codebook; and
 receive a cancellation indication for the PUSCH,
  wherein transmission of the HARQ codebook is cancelled based at least in part on the cancellation indication.

4. The apparatus of claim 3, wherein, according to a rule, the UE is not to multiplex HARQ codebooks in a first uplink transmission occasion after receiving the cancellation indication.

5. The apparatus of claim 1, wherein the one or more processors are further configured to:
 receive additional information indicating a change to a slot format,
  wherein transmission of the HARQ codebook is cancelled if the change to the slot format results in the uplink resource colliding with one or more downlink or flexible resources.

6. The apparatus of claim 5, wherein according to a rule, the UE is not to multiplex HARQ codebooks in a first uplink transmission occasion after the change to the slot format.

7. The apparatus of claim 5, wherein, according to a rule, the UE is not to receive a cancellation indication for the uplink resource for transmission of the HARQ codebook if the change to the slot format results in the uplink resource colliding with the one or more downlink or flexible resources.

8. The apparatus of claim 1, wherein the one or more processors are further configured to:
 receive a request for transmission of a cancelled HARQ codebook; and
 transmit the HARQ codebook.

9. The apparatus of claim 1, wherein the one or more processors are further configured to:
 receive, via radio resource control signaling, a configuration indicating that the indication is to be included in the UCI.

10. The apparatus of claim 1, wherein the indication of whether transmission of the HARQ codebook is cancelled is applicable to one or more HARQ codebooks.

11. The apparatus of claim 1, wherein the one or more processors are further configured to:
 receive a configuration for at least a first downlink control information (DCI) size and a second DCI size that includes an additional bit relative to the first DCI size.

12. An apparatus for wireless communication at a base station, comprising:
 a memory; and
 one or more processors, coupled to the memory, configured to:
  transmit, to a user equipment (UE), information that indicates a resource allocation for a downlink transmission and an uplink resource for transmission of a hybrid automatic repeat request (HARQ) codebook; and
  receive, from the UE, uplink control information (UCI) that includes an indication of whether transmission of the HARQ codebook is cancelled.

13. The apparatus of claim 12, wherein the one or more processors are further configured to:
 transmit additional information that indicates another resource allocation for an additional downlink transmission,
  wherein transmission of the HARQ codebook is cancelled if another uplink resource indicated by the additional information overlaps in time with the uplink resource, and the additional downlink transmission is associated with a higher priority than a priority associated with the downlink transmission.

14. The apparatus of claim 12, wherein the one or more processors are further configured to:
 transmit additional information that indicates an additional resource allocation for a physical uplink shared channel (PUSCH) for multiplexing the HARQ codebook; and transmit a cancellation indication for the PUSCH,
wherein transmission of the HARQ codebook is cancelled based at least in part on the cancellation indication.

15. The apparatus of claim 14, wherein, according to a rule, the UE is not to multiplex HARQ codebooks in a first uplink transmission occasion after receiving the cancellation indication.

16. The apparatus of claim 12, wherein the one or more processors are further configured to:
transmit additional information indicating a change to a slot format,
wherein transmission of the HARQ codebook is cancelled if the change to the slot format results in the uplink resource colliding with one or more downlink or flexible resources.

17. The apparatus of claim 16, wherein according to a rule, the UE is not to multiplex HARQ codebooks in a first uplink transmission occasion after the change to the slot format.

18. The apparatus of claim 16, wherein, according to a rule, the base station is not to transmit a cancellation indication for the uplink resource for transmission of the HARQ codebook if the change to the slot format results in the uplink resource colliding with the one or more downlink or flexible resources.

19. The apparatus of claim 12, wherein the one or more processors are further configured to:
transmit a request for transmission of a cancelled HARQ codebook; and
receive the HARQ codebook.

20. The apparatus of claim 12, wherein the one or more processors are further configured to:
transmit, via radio resource control signaling, a configuration indicating that the indication is to be included in the UCI.

21. The apparatus of claim 12, wherein the indication of whether transmission of the HARQ codebook is cancelled is applicable to one or more HARQ codebooks.

22. The apparatus of claim 12, wherein the one or more processors are further configured to:
transmit a configuration for at least a first downlink control information (DCI) size and a second DCI size that includes an additional bit relative to the first DCI size.

23. A method of wireless communication performed by an apparatus of a user equipment (UE), comprising:
receiving, from a base station, information that indicates a resource allocation for a downlink transmission and an uplink resource for transmission of a hybrid automatic repeat request (HARQ) codebook; and
transmitting, to the base station, uplink control information (UCI) that includes an indication of whether transmission of the HARQ codebook is cancelled.

24. The method of claim 23, further comprising:
receiving additional information that indicates another resource allocation for an additional downlink transmission,
wherein transmission of the HARQ codebook is cancelled if another uplink resource indicated by the additional information overlaps in time with the uplink resource, and the additional downlink transmission is associated with a higher priority than a priority associated with the downlink transmission.

25. The method of claim 23, further comprising:
receiving additional information that indicates an additional resource allocation for a physical uplink shared channel (PUSCH) for multiplexing the HARQ codebook; and
receiving a cancellation indication for the PUSCH,
wherein transmission of the HARQ codebook is cancelled based at least in part on the cancellation indication.

26. The method of claim 23, further comprising:
receiving additional information indicating a change to a slot format,
wherein transmission of the HARQ codebook is cancelled if the change to the slot format results in the uplink resource colliding with one or more downlink or flexible resources.

27. A method of wireless communication performed by an apparatus of a base station, comprising:
transmitting, to a user equipment (UE), information that indicates a resource allocation for a downlink transmission and an uplink resource for transmission of a hybrid automatic repeat request (HARQ) codebook; and
receiving, from the UE, uplink control information (UCI) that includes an indication of whether transmission of the HARQ codebook is cancelled.

28. The method of claim 27, further comprising:
transmitting additional information that indicates another resource allocation for an additional downlink transmission,
wherein transmission of the HARQ codebook is cancelled if another uplink resource indicated by the additional information overlaps in time with the uplink resource, and the additional downlink transmission is associated with a higher priority than a priority associated with the downlink transmission.

29. The method of claim 27, further comprising:
transmitting additional information that indicates an additional resource allocation for a physical uplink shared channel (PUSCH) for multiplexing the HARQ codebook; and
transmitting a cancellation indication for the PUSCH,
wherein transmission of the HARQ codebook is cancelled based at least in part on the cancellation indication.

30. The method of claim 27, further comprising:
transmitting additional information indicating a change to a slot format,
wherein transmission of the HARQ codebook is cancelled if the change to the slot format results in the uplink resource colliding with one or more downlink or flexible resources.

* * * * *